April 1, 1952
H. H. McADAM
2,591,178
APPARATUS FOR AGING MEATS AND STORING VEGETABLES
Filed Dec. 21, 1949
3 Sheets-Sheet 1
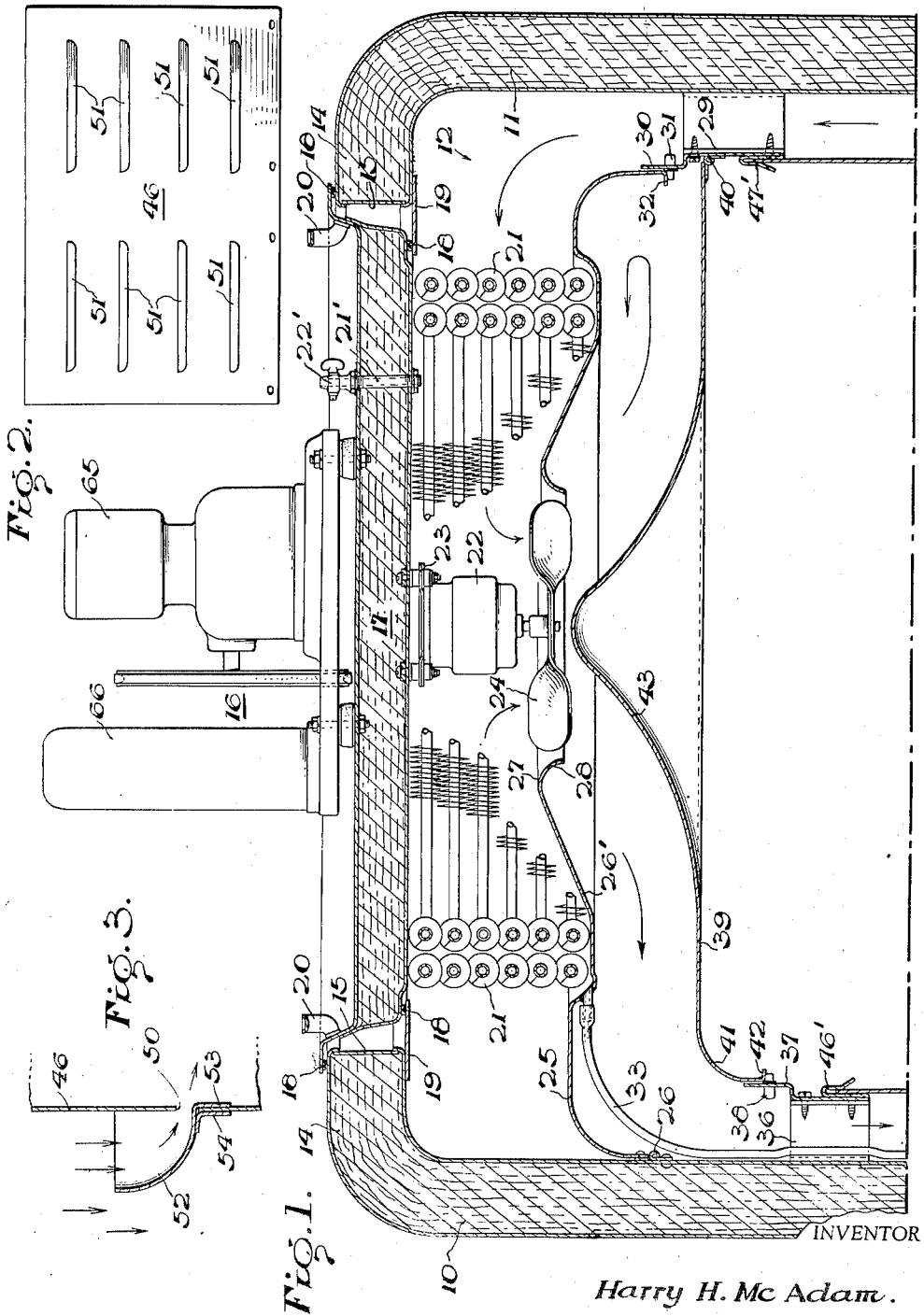
INVENTOR
Harry H. McAdam.
BY Cameron, Kerkam & Sutton
ATTORNEYS

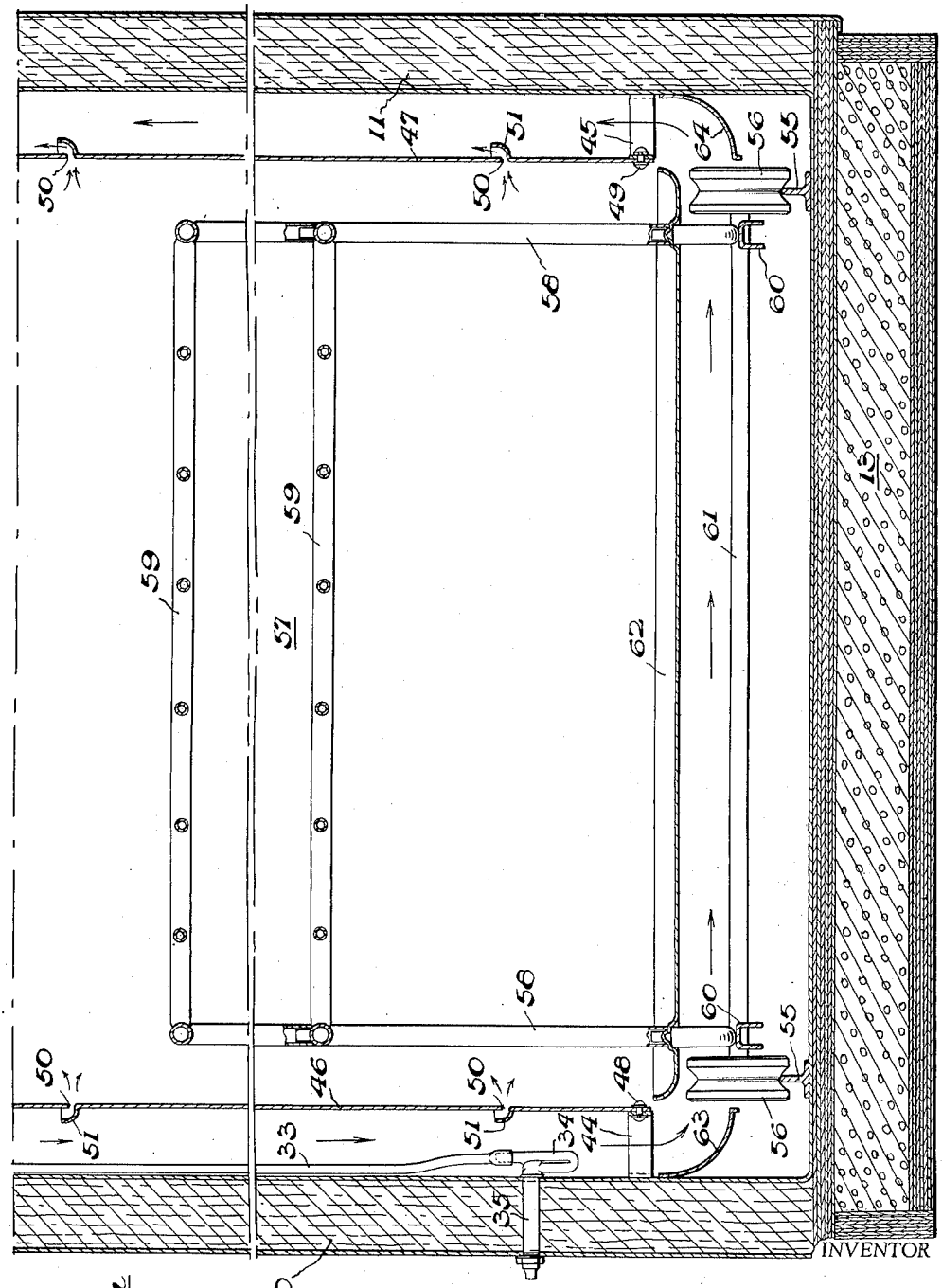

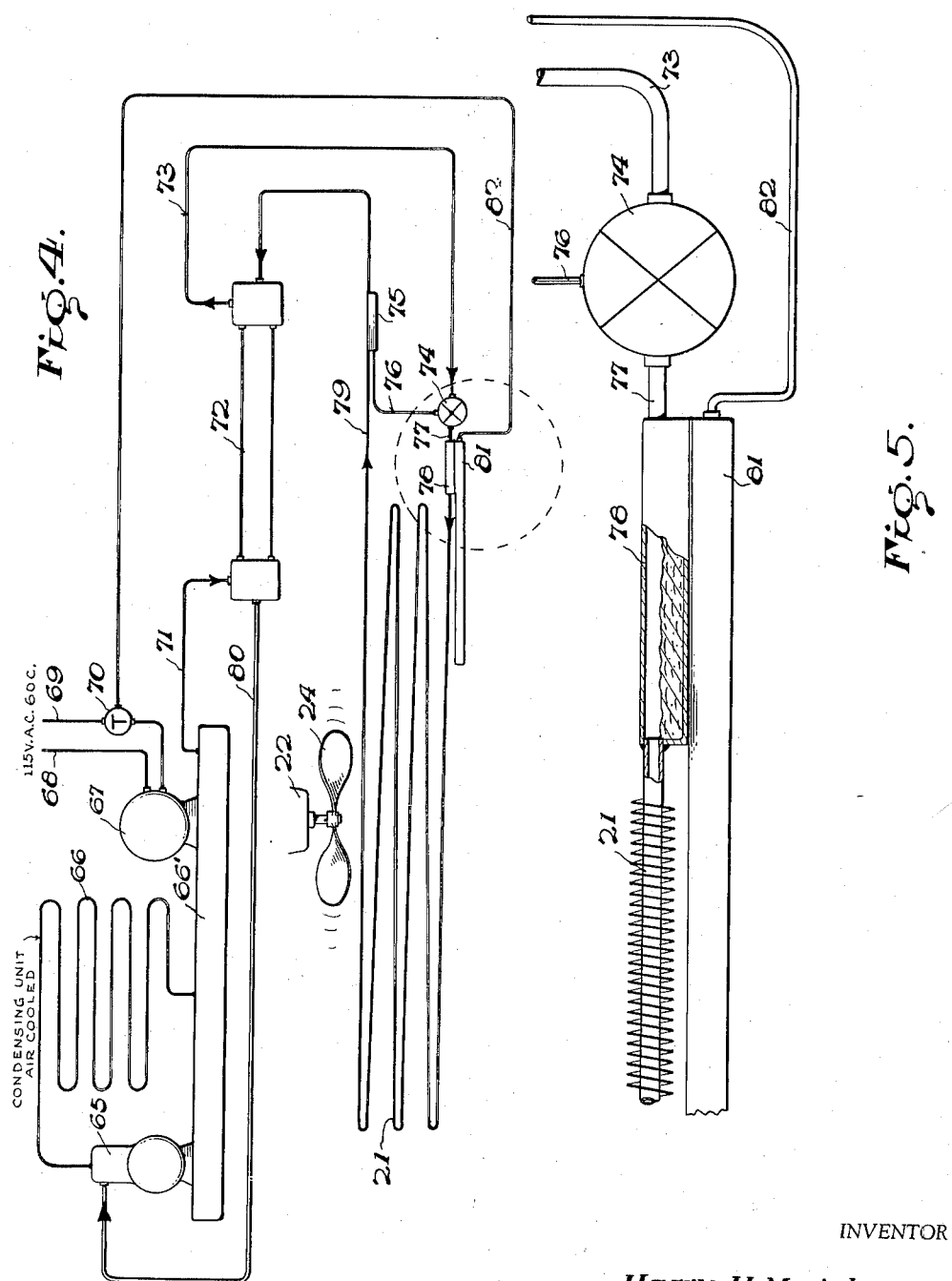

Patented Apr. 1, 1952

2,591,178

UNITED STATES PATENT OFFICE 2,591,178

APPARATUS FOR AGING MEATS AND STORING VEGETABLES

Harry H. McAdam, Redwood City, Calif., assignor to Hodges Research and Development Company, San Francisco, Calif., a corporation of California Application December 21, 1949, Serial No. 134,316

17 Claims. (Cl. 62—4)

This invention relates to apparatus useful for the aging of meats; the storage of green vegetables; the preservation of pastry doughs; and the like and more particularly to such apparatus utilizing controlled conditions of temperature, relative humidity and airflow adjacent the meat, vegetables or dough.

Heretofore various processes and apparatus have been proposed for the aging of meat or the storage of green vegetables or doughs and the like suggesting the use of various relative humidities, temperatures and rates of airflow and among these are those disclosed in the pending application of Allen Latham, Jr., Serial No. 782,348, filed October 27, 1947, and owned by the common assignee of this application as well as Williams Patent No. 2,314,301 and application Serial No. 776,272, now Patent No. 2,560,057, granted July 10, 1951.

Whereas it is known to age meat and to store green vegetables, doughs and the like by passing thereover at controlled velocities streams of air at controlled temperatures in the neighborhood of from 34° to 40° F. and at controlled high humidities approaching 96% R. H., the apparatus heretofore proposed for this purpose has been subject to various disadvantages which the present invention overcomes. In certain of the prior art structures the desired temperatures and relative humidities of the air to be circulated have been maintained only at the expense of complicated refrigeration systems of high power intake and low efficiency and in others the circulation of air over the meat or vegetables has been so lacking in uniformity that the growth of mold is encouraged or improperly aged meats or poorly refrigerated vegetables result. Further in prior art structures no attempt has been made to independently control the total air movement over the cooling surfaces, the component air movement over the product and the admission of new or fresh air. In other structures the arrangement is such that it is impossible to clean and sanitize the same without requiring the expense of much labor and virtual disassembly of the apparatus.

It is accordingly an object of the present invention to provide novel apparatus for the aging of meat, the storage of vegetables or the preservation of pastry doughs and the like wherein controlled conditions of temperature, humidity and airflow can be selected and maintained.

Another object is to provide such apparatus in which closely controlled temperatures within the range 32° to 45° F. can be maintained substantially independent of air movement and/or relative humidity.

Another object is to provide such apparatus in which closely controlled comparatively high relative humidities of between 80 per cent and 96 per cent can be maintained substantially independent of temperature and/or air movement.

Another object is to provide such apparatus in which, for the aging of meats, the cooled humid atmosphere of the enclosure is uniformly circulated over the meat at controlled velocities independent of the total air flow and the admission of fresh air.

Another object is to provide such apparatus in which heat entering the walls of the enclosure is extracted or absorbed by the passage of cooled humidified air thereover to prevent such heat from entering the meat containing cavity, a predetermined controlled percentage of the cooled humidified air is then caused to flow through the body of the enclosure or meat cavity to maintain desired optimum meat aging conditions therein.

Another and still further object of the present invention is to provide a novel lightweight low cost refrigerating system for such apparatus which is of such simplified construction that electric current load is below allowable commercial limits of standard wiring with high refrigeration efficiency.

Another object of the present invention is to provide such apparatus in which all interior cabinet components thereof directly or indirectly subject to contamination are completely accessible without the use of tools for periodic cleaning and sanitizing.

Another object is to provide such apparatus in which a removable wheeled cart is provided within the enclosure supporting a rack assembly for the meat being aged or the vegetables being stored and a pan forming a part of the air circulating system.

Another object is to provide such apparatus in which novel means are provided for assuring a uniform distribution of air at controlled volumes and velocities through the enclosure.

Another object is to provide such apparatus in which the complete refrigeration and air movement system is mounted as a unit upon a closure plug member secured in the top of the apparatus by gravity only which may be readily removed for repair or replacement without the use of tools; without entering the interior of the apparatus; and during use of the apparatus without loss of interior temperatures and humidities.

Another object is to provide such apparatus in which the ceilings thereof can be swung down without the use of tools to facilitate thorough cleaning and sanitizing thereof and in which the side panels can be removed from the cabinet without requiring the use of tools for the same purposes.

Another object is to provide such apparatus in which the air movement fan is surrounded by a recessed plate forming an air directing nozzle which extends beneath the evaporator coils to induce uniform distribution of airflow through the evaporator coils and to collect and discharge condensate dripping therefrom.

Another object is to provide such apparatus in which an air distribution cone is mounted beneath the air movement fan on the upper surface of the lower ceiling member to achieve uniform distribution of air into the elongated side wall duct.

Another object is to provide such an apparatus in which the removable wheeled cart and rack supporting the meat or vegetables has incorporated therewith a combination meat drip pan and lower air duct ceiling.

Another object is to provide such apparatus in which the wheeled cart, the meat supporting racks and the drip pan and air duct ceiling are readily separable without the use of tools to facilitate cleaning and sanitizing.

Another object of the present invention is to provide such apparatus in which a novel refrigeration system achieves refrigerator storage cavity temperature control as a result of a differential of two temperatures acting jointly and simultaneously on the remote bulb element of a control switch. The location and position of this temperature sensitive remote bulb with respect to the system is such that a part of its surface area is in direct thermal contact with the walls of the liquid refrigerant trap placed at the evaporator inlet. The remainder of the bulb's surface is so positioned that air entering the evaporator must pass directly over and act upon that portion of the bulb surface area not in thermal contact with the liquid trap. A feature of this novel temperaure control method resides in the various changes in performance characteristics obtainable by changing the ratio of the sensitive bulb surface area in direct trap contact versus that exposed to air action. The joint, simultaneous action of these two forces acting on the switch bulb results in storage cavity temperature control precision with respect to both range and differential heretofore unattainable with standard commercial control switches applied in the conventional manner.

Another object of this invention is to provide such apparatus in which a novel refrigeration system acts to achieve positive and complete lubricating oil return to the compressor from the evaporator without resorting to the use of special oil separators, and regardless of any unfavorable location of the compressor such as placing it on a higher plane above the evaporator. My concept of oil return is predicated on refrigerant velocity through the evaporator. This velocity is so proportioned that mechanical entrainment picks up and returns to the compressor all oil distilled out in the evaporator. This continuous distillation process, while highly objectionable, is a normal function of all evaporators but it tends to rob the compressor of oil, that oil clogging the evaporator. My unique method achieves positive and complete oil return by controlling refrigerant velocities through the system within limits most advantageous to oil entrainment pickup and return.

Another object is to provide such apparatus in which the fins of the evaporator coil are interleaved vertically to prevent accumulation of water by capillary action therebetween which would otherwise obstruct airflow through the evaporator and to provide a continuous wetted flow path for drainage of water.

Another object is to provide such apparatus in which the fins of the evaporator coil are interleaved vertically to provide uniform resistance to airflow through the entire surface of the coil.

Other and further objects of the present invention will appear from the following description.

My invention is capable of expression in various mechanical embodiments one of which is shown in the accompanying drawings to illustrate the same. This embodiment should in no way be construed as defining or limiting my invention and reference should be had to the appended claims for this purpose. It is to be understood that my invention can be applied not only to refrigerated boxes but also to all types of refrigerated vehicles, rooms, buildings and other refrigerated devices both stationary and portable.

In the drawings, in which like reference characters designate like parts:

Fig. 1 is a cross-sectional elevation of the upper part of a rerfigerated box embodying my invention showing interior box construction and the arrangement of the refrigerating system and air ducts therein;

Fig. 1a is a cross-sectional elevation of the lower part of the structure shown in Fig. 1 showing the bottom of the box and the food supporting cart and rack therein with a meat drip pan supported by the cart forming a part of the air duct of the apparatus;

Fig. 2 is a side view of one of the panels forming the inner wall surfaces of the refrigerated compartment to show the arrangement of the air vents therein;

Fig. 3 is a cross-sectional view in enlarged detail of a part of one of the panels forming the inner wall surfaces of the refrigerated compartment to illustrate one type of scoop for directing air through the air vents therein;

Fig. 4 is a schematic representation of a suitable refrigerating system for use with my novel apparatus; and Fig. 5 is an enlarged detail of a part of the system of Fig. 4 as defined by the circle in broken line therein.

Referring more particularly to Figs. 1 and 1a, the embodiment of my invention as there shown comprises a refrigerated box. The box shown in these figures in actual size has a net capacity of approximately 140 cubic feet with net inside dimensions of approximately 6 feet in height, 3 feet in width and 6½ feet in length. This box is made up of conventionally insulated side walls 10 and 11, insulated rear wall 12, insulated bottom 13, insulated top 14 and an insulated front wall or door which is not shown. Top 14 is circularly cut away at 15 to receive refrigerating apparatus generally indicated at 16. Apparatus 16 is mounted as a unitary structure on insulated platform or closure plug member 17 designed to fit snugly in opening 16, gaskets 18 being provided to obtain an airtight seal therebetween. A circular ring 19 may be mounted beneath opening 15 and secured to the underside of top 14 to form an airtight seal with platform 17 through the use of suitable gaskets 18. Platform 17 may be provided with suitable handles 20 to assist in removing the same for servicing or replacement of the refrigeration system when required. A pipe 21' closed by a suitable valve 22' passes through platform 17 and is utilized to provide desired amounts of fresh air to the air circulating within the apparatus.

Evaporator coil 21 is supported beneath platform 17 and is preferably made of unitarily formed finned tubing of continuous length wound circularly six passes high and two passes deep. The fins of adjacent vertical passes are interleaved as shown to prevent collection of water between the fins; to provide a continuous wetted flow path for drainage; and to provide uniform resistance to airflow through the entire surface of the evaporator coil 21. A fan motor 22 is supported by platform 17 within evaporator coil 21, as by any suitable resilient mounting 23, and drives a suitable air movement fan 24. Fan 24 is so designed that upon rotation thereof by motor 22 air will be induced inwardly through the evaporator coil 21 and outwardly through the fan 24. An air baffle and condensate drip collecting upper ceiling member or pan 25 is hinged at 26 to wall 10 and extends beneath evaporator coil 21 and then upwardly therewithin as at 26' and surrounds fan 24 as at 27 with a downwardly turned nozzle 28 to assist in directing the passage of air through fan 24. Pan 25 extends the entire length of the box from front to rear and extends from wall 10 across the box to a plurality of brackets 29 which are spaced along the entire length of the box from front to rear. Brackets 29 are suitably spaced from the interior surface of side wall 11 preferably on the order of from two to six inches for the size of box described above. Brackets 29 carry an upwardly extending member 30 which also extends the entire length of the box and member 30 carries a plurality of plug type latches 31. Pan 25 has an inturned lip 32 to be engaged by latches 31 to hold pan 25 in its upper position. Latches 31 are moved out of engagement with shoulder 32 by simple manual pressure without the use of tools and pan 25 can be readily rotated about hinge 26 to provide access to coil 21, motor 22 and fan 24 for cleaning and sanitizing or repair.

A suitable flexible drain conduit 33 leads from pan 25 to drain off condensate collected from evaporator coil 21. Conduit 33 is provided with a suitable trap 34 at its lower end to prevent inward flow of outside warm air through conduit 33 and trap 34 drains to the outside of the box through connection 35.

Side wall 10 carries internally thereof a plurality of brackets 36 which are similar to brackets 29 and are spaced from wall 10 preferably on the order of from two to six inches, as described above. Brackets 36 extend along the entire length of the box and are suitably spaced beneath hinge 26. Brackets 36 carry an upwardly extending member 37 which extends the entire length of the box and carries a plurality of plug type latches 38. A lower ceiling member or air distribution panel or pan 39 is hinged to brackets 29 at 40 and extends from brackets 29 across the box and from the front to the rear thereof and terminates in a downwardly curved portion 41 and an inturned flange 42 which flange 42 cooperates with latches 38. Conical surface 43 of rounded line for better air distribution is formed in pan 39 and extends upwardly beneath and adjacent to fan 24. Upon rotation of fan 24 air is induced through evaporator coil 21 and downwardly past nozzle 28 into impingement with surface 43 and is directed by surface 43 with rotary movement into the area defined by the left hand portion of pans 25 and 39.

Side walls 10 and 11 are provided with a plurality of spaced brackets 44 and 45 respectively adjacent bottom 13. Side plates 46 and 47, of similar construction and preferably arranged with two such plates for each side of the box, are suitably and removably secured to brackets 36 and 44 and to brackets 29 and 45 respectively. Side plates 46 and 47 terminate short of the bottom of the box adjacent to brackets 44 and 45. Any suitable means may be utilized for securing the side plates 46 and 47 to brackets 36 and 29 for quick and easy removal and, as shown, this securing means includes channel shaped clips 46' and 47' secured to brackets 36 and 29 respectively and extending the full length of the box. The side plates 46 and 47 engage clips 46' and 47' and are held therein by the resilient action of the clip. Side plates 46 and 47 are suitably secured to brackets 44 and 45 by banjo type locks of conventional design for quick and easy removal and such locks are shown at 48 and 49.

Side plates 46 and 47 define air passages with walls 10 and 11 respectively which extend from the rear to the front of the box. Air flows downwardly in the passage defined by wall 10 and side plates 46 and since it is desired to circulate a part of this air outwardly across the interior of the box means must be provided in plates 46 for passing air therethrough. In prior known structures this circulation of air through the side plates has been provided by a plurality of small holes bored therein or by making the side plates of porous material but I have found that it is impossible to obtain uniform air circulation through such plates. I have found that much more uniform and efficient distribution of air through the side plates 46 and 47 may be obtained by slotting these side plates, as is shown in more detail in Fig. 2. When two side plates are used to cover an inner side wall of the box each such plate has approximate dimensions of 6 feet in height and 3¼ feet in length for the size of box discussed above. I have found that very uniform air distribution is obtained within the box if eight slots are cut in each plate having dimensions of approximately 17 inches in length and ¼ inch in width. Such slots are shown at 50. It is also desirable to provide some positive means for directing the flow of air through the slots 50 and to this end when the slot 50 is being formed the metal may be displaced as at 51 to form inwardly and upwardly extending scoops in the air passage.

When the air has circulated outwardly through slots 50 in plates 46 and across the interior of the box it must pass through the plates 47 into the air passage formed by plates 47 and wall 11 for circulation back to evaporator coil 21. For this purpose a plurality of slots are formed in plates 47 which are identical to the above described slots 50 and in the formation of these slots the metal may be displaced to form scoops 51, as above described, so that the major part of the air passing upwardly in the air passage formed by plates 47 and wall 11 will pass around scoops 51 to induce air through slots 50.

Fig. 3 shows another type scoop for slots 50. As there shown, slots 50 are cut into plates 46 and 47 without displacement of the metal. Thereafter the scoop or lip 52 is formed having a downwardly turned portion 53 and a second downwardly turned element 54 is secured thereto and spaced from element 53. The lip 52 is then secured in position behind slot 50 by engaging the portion of plates 46 and 47 beneath slots 50 between elements 53 and 54.

Bottom 13 of the box supports suitable tracks 55 which receive the wheels or rollers 56 of any suitable cart carrying a separate rack 57 designed to support the meat or vegetables within the box. Rack 57 is of any desired construction and is here shown as comprising uprights 58 supporting shelves 59, the assembly being supported on a chassis 60 of the cart secured to axles 61 of the wheels 56. Since side plates 46 and 47 terminate short of the bottom of the box it is necessary to provide an air passage across the bottom of the box to lead air from the air duct formed between wall 10 and plates 46 to the air duct formed between the side wall 11 and plates 47. For this purpose, and to provide a drip pan for the meat or vegetables supported on the rack, a pan 62 is supported beneath uprights 58 and extends across the box from adjacent the lower edge of plate 46 to adjacent the lower edge of plates 47 and from the front to the rear of the box. Curved plates 63 and 64 are mounted on side walls 10 and 11 respectively beneath brackets 44 and 45 to deflect air passing thereover and in conjunction with pan 62 and bottom 13 from an air duct across the bottom of the box for the passage of air.

For efficiency in operation of the refrigeration system large volumes of air must be circulated over evaporator coil 21 and since the circulation of air across the interior of the box is in relatively small volume it follows that large volumes of the cooled and humidified air do not pass through the box but circulate in the ducts, necessitating the air duct across the bottom of the box formed by pan 62, bottom 13, and deflecting plates 63 and 64. It is particularly desirable to arrange pan 62 on the rack 57 as the upper surface of the air duct across the bottom of the box since the rack 57 is thereby enabled to rest upon the floor of the box and no particular construction is required to support the heavy weights thereon as would be required if the duct across the bottom of the box was formed beneath the rails 55.

A suitable refrigeration system mounted as a unitary structure upon the closure plug member 17 is shown schematically in Figs. 4 and 5. As there shown, this system is seen to comprise a conventional compressor 65 connected to a finned air cooled condenser 66 and driven by a suitable electric motor 67, a one-third horse power condensing unit 16 being suitable for the size of box described above. Motor 67 is preferably an electric motor connected to power lines 68 and 69, a suitable temperature responsive thermostatically controlled switch 70 being connected into line 69. Condenser 66 is connected to receiver 66' which in turn is connected by pipe 71 to a suitable heat exchanger 72 and heat exchanger 72 is connected by pipe 73 to a thermostatically controlled expansion valve 74. Valve 74 is controlled by bulb 75 connected thereto by tubing 76. Valve 74 is connected by tubing 77 with a liquid trap 78 which is in turn connected to evaporator coil 21. The upper side of evaporator coil 21 is connected by tubing 79 with heat exchanger 72 and heat exchanger 72 is connected by tubing 80 with compressor 65. Bulb 75 of valve 74 is responsive to temperatures in tube 79 adjacent the exit end of the evaporator coil 21. Bulb 81 for temperature responsive switch 70 is connected thereto by suitable tubing 82 and is in intimate thermal contact with liquid trap 78 and extends into the air stream passing through the evaporator. In the refrigerating system thus described for efficient operation evaporator coil 21 should have an effective area of approximately 101 square feet of surface and is preferably made of an 80 foot length of integrally finned thin tubing of ½ inch inside diameter circularly coiled 6 turns high and two turns deep. With this arrangement a refrigerant vapor velocity of approximately 600 linear feet per minute is obtained through evaporator coil 21 which entrains any oil in the refrigerant through the coil and eliminates the necessity for an oil separator.

The liquid trap 78 which is adjacent to and thermally connected with bulb 81 assumes a temperature in exact accordance with evaporator pressure to satisfy the saturation-pressure-temperature relationship. Since bulb 81 is responsive to this temperature it is apparent that while switch 70 is a standard temperature responsive thermostatic switch its actuation is derived primarily from the refrigerant pressure within the evaporator and secondarily from air passing through the evaporator 21. Thus while switch 70 is thermally actuated and retains the desirable features of temperature actuation sensitivity it is actuated in accordance with pressure changes of the liquid refrigerant within the evaporator and, since trap 78 retains liquid refrigerant at all times, an internal temperature at bulb 81 is insured commensurate with evaporator pressure.

It is now apparent that by the present invention I have provided novel apparatus for the aging of meats and the storing of vegetables and a novel refrigeration system for use therewith which in every way satisfies and meets the objectives detailed above.

Changes to or modifications of the above described illustrative embodiment of my invention may now be suggested to those skilled in the art without departing from my inventive concept. For instance the dimension of the air passages formed between the side wall 10 and plates 46 and between side wall 11 and plates 47 may be varied to accommodate the desired volume of air to be circulated over evaporator coil 21 for most efficient refrigeration operation and, whereas I prefer to form these ducts of from 2 to 6 inches in depth, other dimensions for the same may be utilized. The refrigeration system described above as particularly suitable for use with my apparatus may also be modified within accepted refrigeration practice without departing from my concept. To determine the scope of my invention reference should therefore be had to the appended claims.

What is claimed is:

1. In apparatus as defined and particularly for the aging of meats or the preservation of vegetables including an enclosure having insulated side walls, insulated rear and front walls, an insulated top, an insulated bottom, an opening in the insulated top, an insulated closure for the opening, a refrigerating system mounted on the closure, and evaporator coils in the refrigerating system supported beneath the closure and extending into the enclosure, a fan carried by the closure for inducing air inwardly through the evaporator coils, a wall spaced from each of the side walls and extending from the rear to the front walls and terminating short of the top and bottom, a plurality of slots in said walls, a pan hinged to one of the side walls extending from the rear to the front walls and extending to the opposite spaced wall and turned upwardly within the evaporator coil and providing a nozzle in which said fan is mounted, a second pan hinged to the other spaced wall extending from rear to front walls and extending to the opposite spaced wall and forming an air deflecting cone beneath said fan, a removable rack in the enclosure supported by the bottom, and a third pan carried by said rack and extending from the rear to the front walls and extending from adjacent the bottom of one of said spaced walls to adjacent the bottom of the other of said spaced walls.

2. Apparatus as described in claim 1 in which said spaced walls comprise at least one plate spaced from and removably secured to the adjacent side wall.

3. Apparatus as described in claim 1 in which brackets are secured to the side walls to space said spaced walls therefrom and said spaced walls comprise at least one plate for each side wall removably secured to said brackets.

4. Apparatus as described in claim 1 in which upper and lower brackets are secured to each side wall to space said spaced walls therefrom, clips extending the lengths of said upper brackets, said spaced walls comprising at least one plate for each side wall secured in said clips and secured to said lower brackets by readily disengageable means.

5. Apparatus as described in claim 1 in which the material from said slots is formed into scoops for directing airflow through said slots.

6. Apparatus as described in claim 1 in which scoops are removably secured adjacent each of said slots for directing airflow therethrough.

7. Apparatus as defined in claim 1 in which curved plates are secured to the side walls and extend from front to rear walls beneath said spaced walls to direct airflow in the air duct formed by said third pan and the bottom.

8. Apparatus as described in claim 1 in which upper and lower brackets are secured to each side wall to space said spaced walls therefrom and said first named pan is movably secured to opposite upper brackets and said second named pan is movably secured to the other upper brackets.

9. Apparatus as described comprising an insulated enclosure having side, rear and front walls, a top, a bottom and air ducts in the side walls extending from front to rear walls and opening into the enclosure short of the top and bottom, an evaporator coil suspended from the top and a fan within the coil to induce air therethrough, a pan movably secured to one side wall above the upper duct opening and extending from front to rear walls and across to the other side wall beneath the upper duct opening, a nozzle in said pan around said fan, a second pan movably secured to said other side wall beneath said first named pan and extending from front to rear walls and across to the opposite side wall beneath the upper duct opening therein, openings in said side walls to permit airflow across the enclosure, and a removable pan spaced from the bottom and extending from front to rear walls and from side wall to side wall above the lower duct openings in the side walls.

10. Apparatus as described in claim 9 in which the side walls include insulated outer wall elements and inner wall elements spaced therefrom and forming air ducts therebetween.

11. Apparatus as described in claim 9 in which said inner wall elements are removable, slots in said inner wall elements and scoops adjacent said slots in the air ducts to direct air through the slots.

12. Apparatus as described in claim 9 in which said first named pan extends upwardly within the evaporator coil to form a condensate collector and said second named pan includes an air deflecting cone extending upwardly adjacent to the fan.

13. Apparatus as described in claim 9 in which said last named pan is removably mounted on a removable cart and assembly rack.

14. In a refrigerating system including a compressor, means for driving said compressor, a condenser, an evaporator, a liquid refrigerant flow control, a heat interchanger, a liquid refrigerant trap, a temperature responsive control switch, and a temperature sensitive remote bulb for said switch so located that a part of its sensitive surface area is in direct thermal contact with and acted upon by said liquid trap and the remainder of its sensitive surface is exposed to and acted on by air flowing over the evaporator, the resultant of these two forces acting jointly and simultaneously on said remote bulb causing said switch to start and stop said compressor in response to the temperature differential existing between said forces thereby achieving precise control of the refrigeration system and its insulated structure.

15. A refrigerating system as described in claim 14 in which refrigerant velocity through the system is controlled by the transverse area of the evaporator tubes with respect to volume of vapor flowing to obtain mechanical entrainment of all lubricating oil deposited out in the evaporator and other parts of the system, thereby eliminating special or accessory oil separating and entrapping devices.

16. A system as described in claim 14 in which said evaporator coil is made of a plurality of vertical and horizontal turns of finned tubing, the fins of the vertical turns being interleaved.

17. Apparatus as described in claim 9 in which manually controlled fresh air admission means are provided adjacent the suction side of said fan.

HARRY H. McADAM.

REFERENCES CITED

The following references are of record in the file of this patent:

UNITED STATES PATENTS

| Number | Name | Date |
|---|---|---|
| 1,947,082 | Haslacher | Feb. 13, 1934 |
| 2,199,779 | Buchet | May 7, 1940 |
| 2,212,748 | Parker | Aug. 27, 1940 |
| 2,223,725 | Heitchue | Dec. 3, 1940 |
| 2,255,947 | Starr | Sept. 16, 1941 |
| 2,474,069 | Silvera | June 21, 1949 |